Jan. 1, 1929.
P. WEBER
TUBE JACK
Filed Jan. 20, 1927
1,696,991
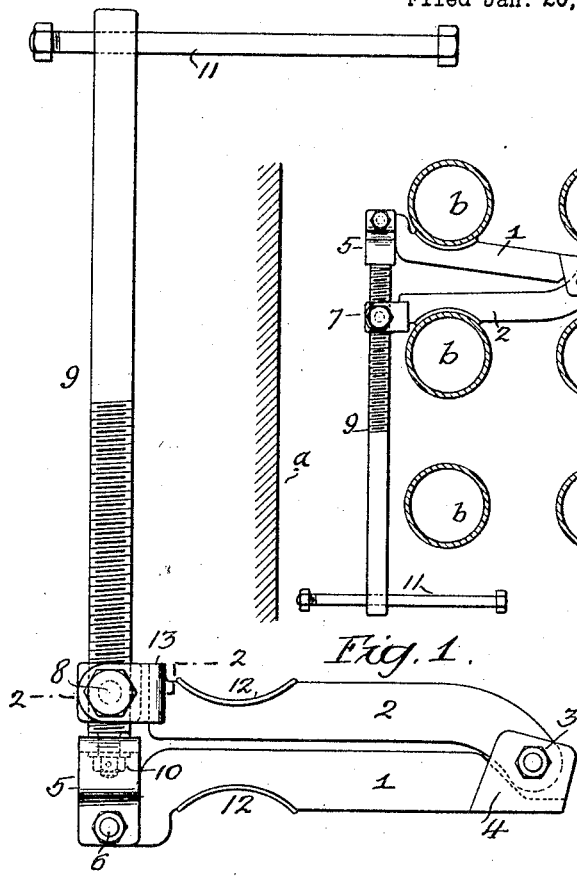
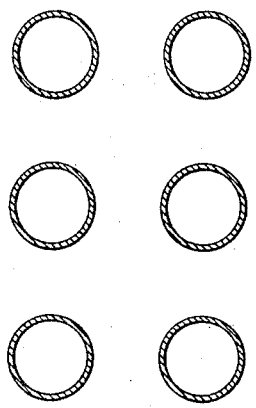
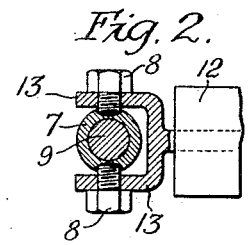
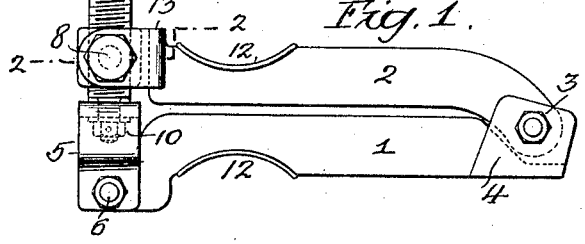
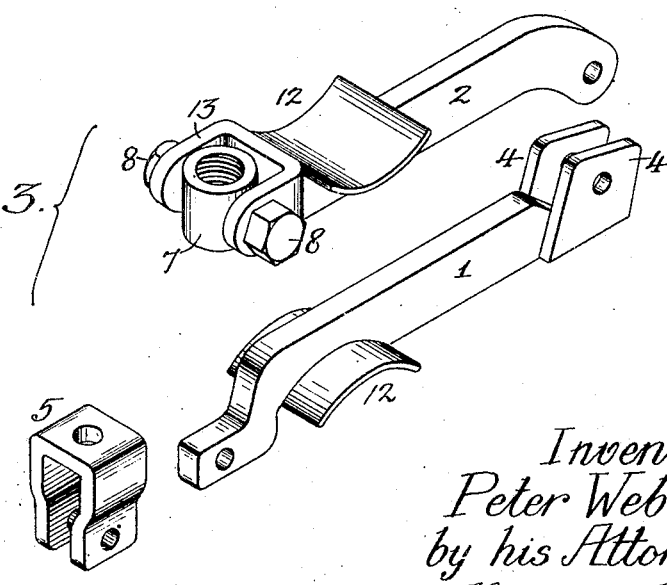
Inventor:—
Peter Weber.
by his Attorneys.—

Patented Jan. 1, 1929.

1,696,991

UNITED STATES PATENT OFFICE.

PETER WEBER, OF PHILADELPHIA, PENNSYLVANIA.

TUBE JACK.

Application filed January 20, 1927. Serial No. 162,347.

The object of my invention is to construct a jack for spreading tubes of pressure stills, tubular boilers, and the like. When it is desired to replace a tube, the jack of my invention can be readily inserted between two tubes and the tubes can be spread apart the distance required by simply turning a hand-screw.

In the accompanying drawing,

Fig. 1 is a side view illustrating my improved jack for spreading tubes;

Fig. 2 is a sectional view on the line 2—2, Fig. 1;

Fig. 3 is a view showing parts of the jack detached; and

Fig. 4 is a diagrammatic plan view showing the jack in position between two tubes.

The two members 1 and 2 of the jack are pivotally connected by a pivot-pin 3 in the form of a bolt which passes through the two cheek-pieces 4—4 of the member 1 and through that portion of the member 2 which is located between the cheek-pieces.

The opposite end of the member 1 is bent as shown in Fig. 3 and connected to this end of the member is a yoke 5, a pivot-pin 6 coupling the two parts together.

The end of the member 2 is forked as at 13 and located in the forked end is a nut 7. The nut has recesses to receive the pivot bolts 8—8 which extend through threaded openings in the forked end of the member 2. An operating screw 9 extends through the nut 7 and is held in the yoke 5. The screw is reduced in diameter at the end and extends through a hole in the yoke. A nut 10 and a washer are mounted on the projecting end of the screw and hold the nut to the yoke, but allow the screw to turn in the yoke.

At the opposite end of the screw is a cross bar 11 by which the screw can be turned. The bar can slide in the screw to allow it to pass obstructions when being turned to open or close the jack.

Each member 1 and 2 has a curved portion on which is secured a curved plate 12, the curve of the plates being substantially that of the tubes to be spread apart.

Referring to the diagram shown in Fig. 4, the wall of a pressure-still is indicated at $a$, and $b$ are the tubes. The tubes are connected to upper and lower headers (not shown).

When it is desired to replace a tube, the jack is inserted between two tubes as shown in Fig. 4 about midway of the length of the tubes and when the curved portions are opposite the tubes, the screw is turned, causing the members to open and engage the tubes $b$—$b$, and on continuing the movement the tubes are spread apart sufficiently to allow a tube to be removed and another placed in position. The tubes engaged by the curved surface of the jack hold the jack against longitudinal movement. After a tube has been replaced, the jack can be collapsed and readily removed.

I claim:

1. The combination in a tube-jack, of two members pivotally connected; an operating screw attached to the outer end of one member; and a nut on the outer end of the other member which is engaged by the screw, the members having curved surfaces between the screw and the pivot to engage the tubes to be spread apart.

2. The combination in a tube-jack, of two members pivotally connected at one end; a yoke pivoted to the opposite end of one member, the end of the other member being forked; a nut swivelled in the forked end of said member; and an operating screw attached to the yoke and free to turn therein and extending through the nut, so that on turning the screw, the members of the jack can be moved to or from each other.

PETER WEBER.